Jan. 20, 1953 — R. C. WHITEHEAD, JR., ET AL — 2,625,820
LIQUID-LEVEL GAUGE
Filed Feb. 13, 1951 — 2 SHEETS—SHEET 1

*INVENTOR.*
ROBERT C. WHITEHEAD JR.
CHARLES E. WEST
BY Arthur H. Swanson
ATTORNEY.

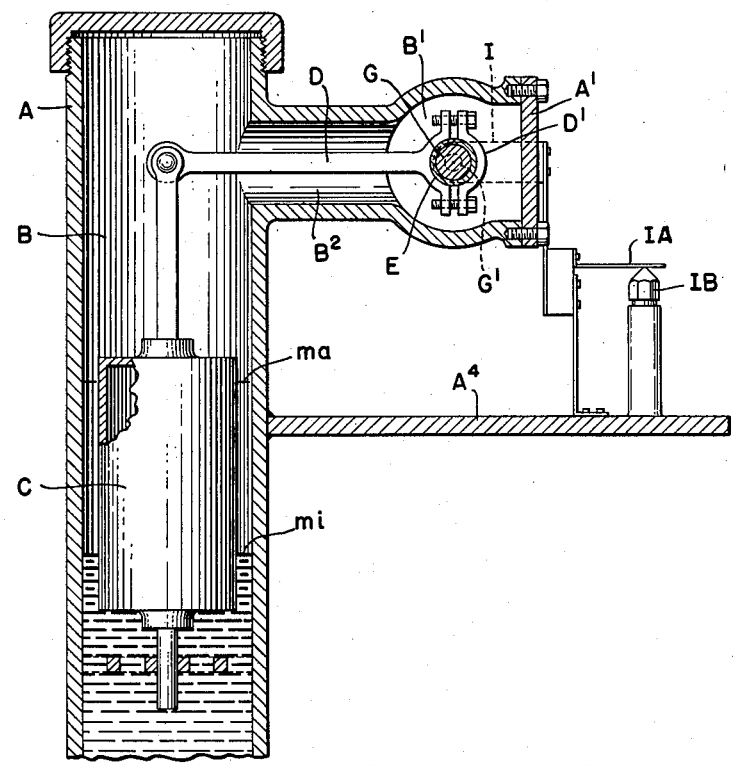

Patented Jan. 20, 1953

2,625,820

UNITED STATES PATENT OFFICE 2,625,820

LIQUID LEVEL GAUGE

Robert C. Whitehead, Jr., and Charles Ernest West, Philadelphia, Pa., assignors to Minneapolis-Honeywell Regulator Company, Minneapolis, Minn., a corporation of Delaware Application February 13, 1951, Serial No. 210,656

12 Claims. (Cl. 73—309)

The present invention relates to improvements in apparatus for measuring, indicating and/or recording variations in conditions and forces.

More specifically, the invention relates to apparatus in which an input force to be measured is employed to distort a tube by subjecting the tube to a torque or twisting force, and in which the distortion of the tube is utilized to create a measurable force which constitutes a measure of the input force and can be utilized as a reaction force equal to and opposing the torque force impressed on the tube by the input force under measurement. The elimination of a net twisting force or torque on the tube while the reaction force is maintained, permits a measurement of the input force which is free from errors due to variations in the torque needed to produce extended twists, which variations tend to result from changes in the temperature of the tube.

A general object of the present invention is to provide improved apparatus of the above mentioned type, comprising novel mechanisms, characterized by their simplicity and effectiveness for creating and applying said measurable reaction force, and thereby eliminating the effect of ambient temperature changes on the extent of the distortion produced by said torque.

A more specific object of the invention is to provide apparatus of the character specified in which a horizontal torque tube has its ends anchored in opposing portions of the wall of a container, with its bore in communication with the atmosphere; and in which an element extending through said tube has a short intermediate portion rigidly connected to the central portion of the tube, and in which suitable means are provided to apply a twisting force or torque at the central portion of the tube in accordance with an input force to be measured. The end portions of the element which protrude from the ends of the tube thus tend to share the rotative movement of the central portion of the tube and are utilized in developing and applying the reaction force. It is an important feature of the present invention that with this arrangement there is eliminated any tendency of the end portions of the element to have imparted to them transverse as well as rotative movement upon a change in the input force under measurement.

A further specific object of the invention is to provide simple and effective means including an air actuated servo-motor to return the tube to its original undistorted condition without modifying the measurable reaction force except as required to eliminate the effect of tube temperature on the extent of tube deflection initially produced by a change in the input force under measurement.

One practical application of the present invention is in the measurement of the level and the changes in level of a liquid in a container and particularly in a liquid container which holds a heated liquid and is sealed from the atmosphere and is subjected to a pressure acting on the liquid surface which may vary with operating conditions, as does the pressure in a steam boiler or an oil still. When the invention is so applied, there is provided an elongated liquid displacing member of predetermined weight and which is submerged in the liquid and upon which the liquid exerts a buoyant force of magnitude varying in accordance with the liquid level. This buoyant force of the liquid on the displacing member is employed to effect a distortion of the torque tube by subjecting the latter to a torque or twisting force. The resulting distortion of the tube is utilized to create a measurable force which provides a measure of the liquid level and which is utilized as a reaction force to oppose the buoyant force impressed on the tube by the displacing member. Thus, the displacing member is submerged to an extent determined by the level of the liquid, and a measure of the liquid level is obtained with no significant movement of the displacing member from its initial or original position. More specifically, the measurement of liquid level over the entire range of variation is accomplished with movements of only a few thousandths of an inch of the displacing member. Also, the operation of the apparatus in eliminating a net twist force or torque on the tube while the reaction force is maintained, permits a liquid level measurement free from errors which would otherwise tend to result because of changes of the ambient temperature of the tube. As those skilled in the art will understand, the reaction force can be used for other control purposes.

While the apparatus of the present invention is herein illustrated as applied to measuring variations in the liquid level in a liquid container, it will be understood that it may be applied to the measurement of other variable factors such as specific gravity or density of a liquid, and rate of flow of a liquid. Since the displacing member is of predetermined weight, the upward or buoyant force exerted by the liquid on it will vary with the specific gravity of the liquid and thus an accurate measure of the specific gravity will be accomplished if the liquid level is maintained constant. Similarly, if the input force is made to vary in accordance with the rate of flow of a liquid through a conduit, as for example, by the use of a manometer or by the use of a so-called "dry" flow meter, known in the arts, an accurate measure of the fluid rate of flow may be obtained by means of the apparatus of the present invention.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Of the drawings:

Fig. 3 is a partial section on the line 3—3 of Fig. 2.

Figure 1:
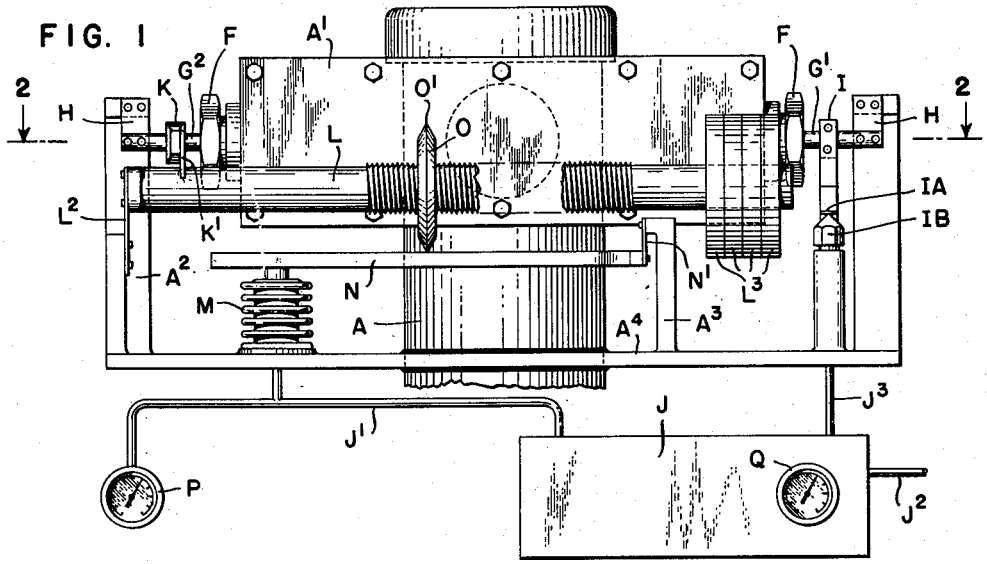
Fig. 1 is a somewhat diagrammatic elevation illustrating a desirable form of the invention.
Figure 2:
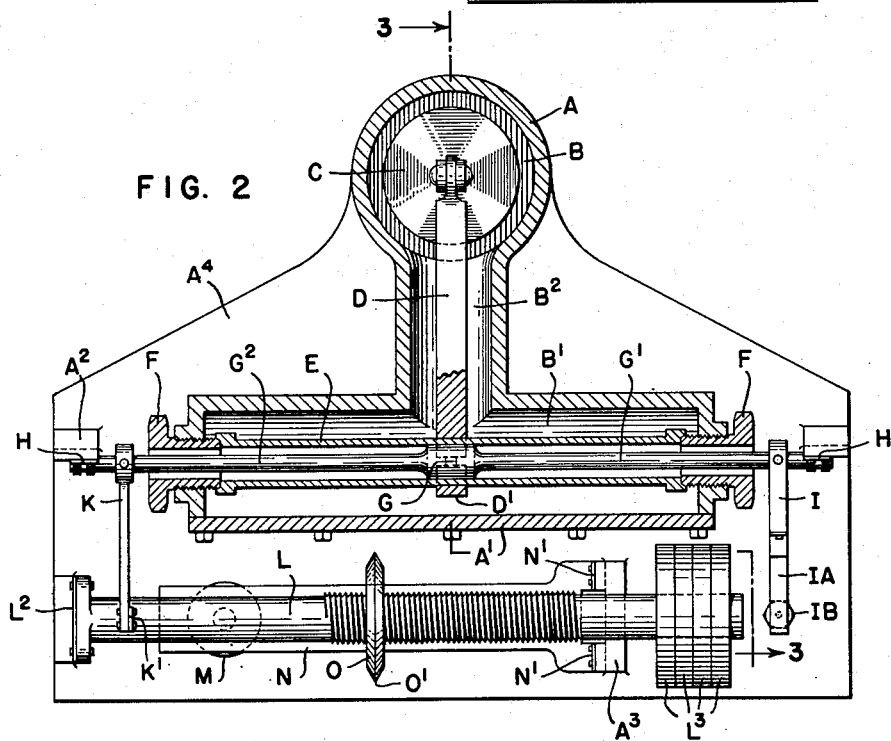
Fig. 2 is a horizontal section taken on the line 2—2 of Fig. 1.

In the drawings there is illustrated apparatus for measuring and exhibiting variations in the level of a liquid. Specifically, there is shown a supporting structure or framework A enclosing a vertical displacing member chamber B, a horizontal torque tube chamber or space B' and a transverse passage $B^2$ connecting the chamber B and the space B'. A transverse arm D having one end rigidly connected to the central portion of the torque tube E, extends through the passage $B^2$ and has its other end connected to an elongated displacing member C of predetermined weight and partially submerged in liquid in the chamber B, and thereby normally is subjected to a floative or buoyant force depending on the height of the liquid level in the chamber B'. The tube E has its ends anchored in opposing end walls of the space B', by means of externally threaded tubular clamping members F. As shown, the latter form end extensions of the tube E. Axially disposed in the tube E is an element G having an enlarged central portion fitting snugly in and secured to the central portion of the tube E. As shown, the tube E is compressed into gripping engagement with the element G by clamping means which include a clamping bolt D' and also serves to secure the arm D to the tube E.

Ordinarily and as shown, the element G is in the form of a solid metal bar, but its form may be varied. The portions of the element G at opposite ends of its central portion, G' and $G^2$ form arms having diameters smaller than the internal diameter of the tube E, which protrude through the open ends of said tube. The projecting ends of the arms $G^1$ and $G^2$ are connected to the structure A by flexible transverse supporting arms H which offer no significant opposition to the small rotative movements of said arms or of the tube E. The projecting end portion of the arm G' carries a transverse arm I having an outer end portion serving as a support for a flapper valve IA. As the central portion of the tube E is rotated in one direction or the other, the flapper IA is moved respectively upward and away from, or downwardly and toward a stationary bleeder nozzle IB, to thereby vary the output air control pressure maintained in the conduit J' of a diagrammatically illustrated air controller J. The latter is connected by a pipe $J^2$ to a source of air under a substantially constant and suitably high air pressure, and is connected to a bleed nozzle IB by a pipe $J^3$. In practice, the air controller J, diagrammatically shown in Fig. 1, may well be of any one of the various known types. For example, it may be of the type shown in the Moore Patent 2,303,891 issued December 1, 1942. Since the air control mechanism actuated or controlled by the displacing member C need not differ significantly from that shown in said Moore patent, said mechanism need not be further illustrated or described herein.

The apparatus shown herein includes a mechanical follow-up mechanism comprising a transverse lever K secured to the projecting end portion $G^2$ and connected by a flexible strap K' to the horizontal beam L. The latter has one end connected to a hinge plate $L^2$. The plate $L^2$ may be formed of flexible metal and has one end rigidly connected to the bracket $A^2$ portion of the structure A. The structure A includes a transverse plate $A^4$ which is rigid therewith and supports the bracket $A^2$ portion at its left end. The beam L is thus pivotally connected to the supporting structure A to turn up and down through a small angle about the horizontal axis of the pivotal connection formed by the flexible plate $L^2$. Removable weights $L^3$ carried on the free end of the beam L may be removed or adjusted to vary the aggregate leverage effect on the beam L of said weights and thereby to vary the position assumed by that beam end for each angular balancing position to which the flapper valve IA may be adjusted. The weights $L^3$ thus provide a readily adjustable means to balance the dead weight of the displacer C and also serves a zero adjustment purpose.

In the arrangement shown, an increase or decrease in the height of liquid level in the displacing member chamber B, and the consequent rotation of the arm G', causes the flapper valve IA to respectively approach or move away from the bleeder nozzle IB. This results in a respective increase or decrease in the control air pressure in the air controller pipe J'. That pressure is transmitted to a servo-motor in the form of a bellows M, the lower end of the bellows M is stationary and its movable upper end bears against the under side of a lever N, adjacent one end of the latter. The second end of the lever N is pivotally connected by a flexible metal suspension strip hinge N' to a bracket portion $A^3$ rigidly supported by the transverse plate $A^4$ of the supporting structure A. The lever N acts on the beam L through an adjustable fulcrum element O. The latter is in the form of an internally threaded ring surrounding and in threaded engagement with the externally threaded body of the beam L. The ring O has a sharp peripheral edge O', and the leverage with which the servo-motor M acts on the beam L depends upon the distance between the vertical plane including the peripheral edge O' of the member O and the planes of the hinge plate $L^2$ and N'.

In operation, an increase in the height of liquid level in the float chamber C rotates the central portion of the tube E about the tube axis, and effects a corresponding angular adjustment of the arm G'. That angular adjustment of the arm G' moves the flapper valve IA toward the bleed nozzle IB, and thereby increases the air pressure in the pipe $J^3$ and causes the air controller J to increase the air pressure transmitted to the servo-motor M by the pipe J'. The increase in the air transmitted from the air controller J to bellows M expands the latter, and thereby causes the beam L to turn upward about the axis of its hinge support $L^2$, until the angular movement thereby given to the arm K eliminates substantially all of the twist given the central portion of the torsion tube E by the previous increase in the liquid level height in the float chamber B. Operative actions and results, opposite in direction to those just described, are produced by a decrease in the height of the liquid level in the float chamber B.

When the displacing member C is suitably shaped for the purpose, the apparatus described will operate to normally maintain the displacing member C at an approximately constant level, notwithstanding substantial variations in the liquid level in the displacing chamber C. The shape of the displacing member required is that needed to vary the buoyant force of the contacting liquid on the displacing member C in linear proportion to the variations in the percent of the liquid level in the chamber B. Thus the displacing member will normally be maintained at an approximately constant level if the horizontal cross sectional area of the displacing member C is uniform in the portion thereof between the maximum level $ma$ and the minimum liquid level $mi$.

As the liquid level in the chamber B varies, the balancing air pressure in the conduits $J^3$ and J' vary correspondingly. Theoretically, the stabilized positions of the flapper valve IA, and hence, of the central portion of the torsion tube E must vary. However, with air control apparatus of standard commercial type, the maximum required difference between the balancing position of the flapper valve at maximum and minimum liquid levels will be only about two thousandths of an inch from its balancing position when the liquid level is midway between the lines $ma$ and $mi$. The effect of such small variations on the stabilized positions of the displacing member C and beam L is not significant. The arm $G^2$ may be made of such material and with such cross section as to be much stiffer than the tube E. It is to be noted, however, that any angular distortion or twist given the arm $G^2$ as the height of liquid level in the float chamber B increases, will not significantly vary the balancing positions of the flapper valve IA, though it may slightly increase the time required to rebalance the apparatus.

As will be apparent, a measure of the liquid level height in the chamber B is obtainable by the use of an ordinary pressure gauge P, if supplied with a suitable graduated scale, and connected to the pipe J' to respond to the control pressure in that pipe. An indicator, such as that designated by the symbol Q may be mounted on the housing of the air controller J to respond to the air supply pressure. The air controller J may also include, or be combined with, recording mechanism in a known manner to provide a continuous measure and record of the varying height of the liquid level in the chamber B.

As will be apparent, the apparatus illustrated and herein described above is characterized by its mechanical simplicity and relatively rugged character and by its operative reliability.

The rigid anchorage of each end of the torsion tube E and the means for normally maintaining the tube in a fixed normal position except momentarily when responding to changes in the liquid level, substantially eliminate risk of measurement error due to a "set" or permanent deformation, of the tube by the twisting actions to which the tube is subjected as the liquid level in the float chamber varies. In said normal position, the torque to which the central portion of the tube E is subjected by the displacing member C, is balanced by the counter-torque impressed on the central portion of the tube through the element G by a servo-motor, and its mechanical connection with the end portion $G^2$ of the chamber G.

With each end of the torsion tube E firmly held in a fixed position and with the bore of the tube sealed from the space containing the float, and with the central portion of the tube E rigidly connected with the central portion of the element G, the control of the controller air pressure through the connection between the flapper or bleed valve IA and the portion of the element G' protruding from the tube E, the adjustment of the valve is solely dependent on the angular adjustment of the tube E. The stresses and strains to which the tube E and element G are subjected have no effect on the position of the valve IA, except as such stresses and strains determine the angular position of the central portion of the tube E.

As previously explained, a change in the liquid level results in an angular displacement of the central portion of the tube E. The stresses and strains to which the arm $G^2$ is subjected may vary the changes in the length of bellows M required to return the central portion of the tube E to its normal position. However, that change in the length of the bellows M is produced by increasing or decreasing the volume of air in the bellows, and does not modify the air pressure in the bellows which exists when the central portion of the tube E is returned to its normal position.

While, in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. A liquid level responsive mechanism, comprising structure enclosing a space including a lower portion arranged to hold liquid having its upper surface varying between lower and upper levels and having spaced apart side wall portions at opposite sides of a portion of said space, a vertically elongated displacing member normally occupying a substantially constant position in which its upper and lower end portions are respectively above said upper level and below said lower level, whereby said liquid subjects said displacing member to a buoyant force which increases and decreases as the liquid level rises and falls, means controlling the vertical movements of said displacing member comprising a horizontally disposed torsion tube having its ends anchored in said side walls, a lever arm transverse to said tube and having one end secured to a central portion of said tube and having its other end connected to said displacing member and actuated by the latter to angularly adjust the central portion of said tube in accordance with the vertical movement of the displacing member on a change in said liquid level, an element having a portion within and secured to the central portion of said tube and a portion protruding from said tube, air control mechanism including a control valve adjusted by said element to maintain a controlling air pressure varying with this liquid level in said space, and a servo-motor mechanically connected to the central portion of said tube and actuated by said controlling air pressure to subject the central portion of said tube to a counter torque normally balancing the first mentioned torque and thereby maintaining said displacing member at said approximately constant level.

2. Apparatus as specified in claim 1, in which said element has one end portion projecting from one end of the torsion tube and arranged to adjust said control valve, and has a second end portion projecting from the other end of said tube, and a mechanical connection between the last mentioned end portion and said servo-motor through which the latter subjects the central portion of the torsion tube to said balancing counter torque.

3. Apparatus as specified in claim 2, in which said mechanical connection comprises a pair of levers adjacent one another and each substantially parallel with said tube, a separate supporting hinge connection at one end of each lever, a mechanical connection between a point on one of said levers adjacent said one end and the second end portion of said element, a mechanical connection between a portion of the other lever displaced from the second end of the latter and said servo-motor, and a thrust transmitting fulcrum part interposed between the two levers and adjustable longitudinally thereof.

4. Apparatus as specified in claim 3, in which one of said levers is externally threaded, and in which said fulcrum part is an internally threaded annulus surrounding and in threaded engagement with the last mentioned lever.

5. Apparatus as specified in claim 1, comprising clamping means encircling the central portion of said torsion tube and arranged to compress the latter into gripping engagement with the central portion of said element.

6. Apparatus as specified in claim 5, in which said clamping means is connected to said one end of said lever arm and secures the latter to the central portion of said torsion tube.

7. Measuring apparatus comprising structure enclosing a space having spaced-apart side wall portions at opposite sides of a portion of said space, a horizontally disposed torque tube having its ends anchored in said side walls, a lever arm transverse to said tube and having one end secured to a central portion of said tube and adapted to have a force to be measured applied to its other end to produce an angular adjustment of the central portion of said tube in accordance with the change in magnitude of said force, an element having a portion within and secured to the central portion of said tube and a portion protruding from said tube, air control mechanism including a control valve adjusted by said element to maintain a controlling air pressure varying with the force applied to said other end of said lever arm, and a servo-motor mechanically connected to the central portion of said tube and actuated by said controlling air pressure to subject the central portion of said tube to a counter torque normally balancing the force being measured.

8. Apparatus as specified in claim 7, in which said element has one end portion projecting from one end of the torsion tube and arranged to adjust said control valve, and has a second end portion projecting from the other end of said tube, and a mechanical connection between the last mentioned end portion and said servo-motor through which the latter subjects the central portion of the torsion tube to said balancing counter torque.

9. Apparatus as specified in claim 8, in which said mechanical connection comprises a pair of levers adjacent one another and each substantially parallel with said tube, a separate supporting hinge connection at one end of each lever, a mechanical connection between a portion of one of said levers displaced from the second end thereof and the second end portion of said element, a mechanical connection between a point on the other lever adjacent the free end thereof and said servo-motor, and a thrust transmitting fulcrum part interposed between the two levers and adjustable longitudinally thereof.

10. Apparatus as specified in claim 9, in which one of said levers is externally threaded, and in which said fulcrum part is an internally threaded annulus surrounding and in threaded engagement with the last mentioned lever.

11. Apparatus as specified in claim 7, comprising clamping means encircling the central portion of said torsion tube and arranged to compress the latter into gripping engagement with the central portion of said element.

12. Apparatus as specified in claim 11, in which said clamping means is connected to said one end of said lever arm and secures the latter to the central portion of said torsion tube.

ROBERT C. WHITEHEAD, Jr.
CHARLES ERNEST WEST.

REFERENCES CITED

The following references are of record in the file of this patent:

UNITED STATES PATENTS

| Number | Name | Date |
|---|---|---|
| 1,237,478 | Clift | Aug. 21, 1917 |
| 2,248,322 | Annin | July 8, 1941 |